United States Patent [19]
Sunvold

[11] Patent Number: 5,932,258
[45] Date of Patent: Aug. 3, 1999

[54] COMPOSITION AND PROCESS FOR IMPROVING GLUCOSE METABOLISM IN COMPANION ANIMALS

[75] Inventor: Gregory Dean Sunvold, Eaton, Ohio

[73] Assignee: The Iams Company, Dayton, Ohio

[21] Appl. No.: 09/055,538

[22] Filed: Apr. 6, 1998

[51] Int. Cl.⁶ ........................................... A23K 1/18
[52] U.S. Cl. ................................. 426/2; 426/805; 426/623
[58] Field of Search .................................. 426/2, 805, 623

[56] References Cited

U.S. PATENT DOCUMENTS

| | | | |
|---|---|---|---|
| 4,828,846 | 5/1989 | Rasco et al. .................................. | 426/18 |
| 5,087,623 | 2/1992 | Boynton et al. ........................... | 514/188 |
| 5,175,156 | 12/1992 | Boynton et al. ........................... | 514/188 |
| 5,576,306 | 11/1996 | Dressman et al. .......................... | 514/57 |
| 5,585,366 | 12/1996 | Gallaher et al. ........................... | 514/57 |
| 5,605,893 | 2/1997 | Kaufman ..................................... | 514/60 |
| 5,616,569 | 4/1997 | Reinhart ..................................... | 514/54 |

OTHER PUBLICATIONS

Liang et al., J. Dairy Science, vol. 53, pp. 336–341, 1970.
Purina CNM Veterinary Product Guide, 1994.

*Primary Examiner*—Chhaya D. Sayala
*Attorney, Agent, or Firm*—Killworth, Gottman, Hagan & Schaeff, LLP

[57] ABSTRACT

A composition and process of use are provided to improve glucose metabolism in companion animals by controlling the postprandial glycemic response in those animals. The composition includes a source of protein, a source of fat, and a source of carbohydrates from a multiple grain source comprising a blend of sorghum and barley.

19 Claims, 2 Drawing Sheets

COMPOSITION AND PROCESS FOR IMPROVING GLUCOSE METABOLISM IN COMPANION ANIMALS

BACKGROUND OF THE INVENTION

The present invention relates to a composition and process of using it to improve glucose metabolism in companion animals.

Several different conditions are associated with impaired glucose metabolism in companion animals such as the dog and cat. These include diabetes (both insulin dependent type and maturity onset type), obesity, geriatrics, and gestation (pregnancy). It is estimated that one out of every 100 dogs seen by a practicing veterinarian is diabetic. Obesity is estimated to occur in approximately 40% of the dog population. Of course, older companion animals (approximately 10% of the U.S. dog and cat populations are believed to be 11 years of age or older) and pregnant animals are common. Accordingly, there is a substantial percentage of the dog and cat population which are in categories associated with risk of having or developing problems with glucose metabolism.

Additionally, the diagnosis of diabetes or impaired glucose metabolism in dogs and cats usually only occurs after a hyperglycemic episode for the animal. Thus, animals which are borderline diabetics, or otherwise have moderately impaired glucose metabolisms, run a significant risk of not being diagnosed with diabetes until their condition has progressed and unmistakable symptoms have manifested themselves.

Ingestion of a meal results in a postprandial glucose response. This response is characterized by a surge in blood glucose. Insulin is the body's primary hormone that is used to store blood glucose. Thus, blood insulin levels generally go up after a meal as well as glucose. A relatively low insulin response to a meal indirectly indicates that postprandial glucose absorption was minimal. Thus, a means to prevent this "surge" in glucose and insulin after a meal would be advantageous to an animal with impaired glucose metabolism.

There have been attempts made in the past to control diabetics not only with drug therapy, but also with diet. Dietary fiber has been found to have an effect on controlling diabetes under certain circumstances. The addition of certain soluble fibers such as guar and pectin have been found to yield a reduced postprandial rise in blood glucose levels. However, not all soluble fibers provide benefits, and some result in undesirable side effects for the animal including diarrhea, flatulence, and abdominal cramping.

It would be desirable to be able to regulate and improve glucose metabolism in animals having impaired glucose metabolism. It would also be desirable to be able to regulate and improve glucose metabolism in even seemingly healthy animals with no overt symptoms to prevent the onset of a chronic diabetic condition. Accordingly, there still remains a need in the art to manage and improve glucose metabolism in a companion animal through diet to prevent or mediate the onset of impaired glucose metabolism that leads to diabetes or obesity or is associated with geriatric or gestating individuals.

SUMMARY OF THE INVENTION

The present invention meets these needs by providing a composition and process of using it to improve glucose metabolism in companion animals by controlling the postprandial glycemic response in those animals. In accordance with one aspect of the present invention, a pet food composition is provided and includes a source of protein, a source of fat, and a source of carbohydrates from a multiple grain source and comprising a blend of sorghum and barley. Preferably, the ratio of sorghum to barley is from about 1:3 to about 3:1, and more preferably the ratio of sorghum to barley is about 1:1. Preferably, the composition comprises from about 25 to about 35% crude protein, from about 8 to about 12% fat, from about 5 to about 20% total dietary fiber, and a source of starch which includes the blend of sorghum and barley, although no specific ratios or percentages of these nutrients are required.

The pet food composition may optionally include chromium tripicolinate and a water soluble, cellulose ether. Additionally, the pet food composition may further include from about 1 to about 11 weight percent of supplemental total dietary fiber of fermentable fibers which have an organic matter disappearance of 15 to 60 weight percent when fermented by fecal bacteria for a 24 hour period.

The invention also includes a process for controlling postprandial glycemic response in a companion animal comprising the step of feeding the companion animal a pet food composition consisting essentially of a source of protein, a source of fat, and a source of carbohydrates comprising a blend of sorghum and barley.

Accordingly, it is a feature of the present invention to provide a composition and process of using it to improve glucose metabolism in companion animals by controlling the postprandial glycemic response in those animals. This, and other features and advantages of the present invention, will become apparent from the following detailed description, the accompanying drawings, and the appended claims.

DETAILED DESCRIPTION OF THE PREFERRED EMBODIMENT

Figure 1:
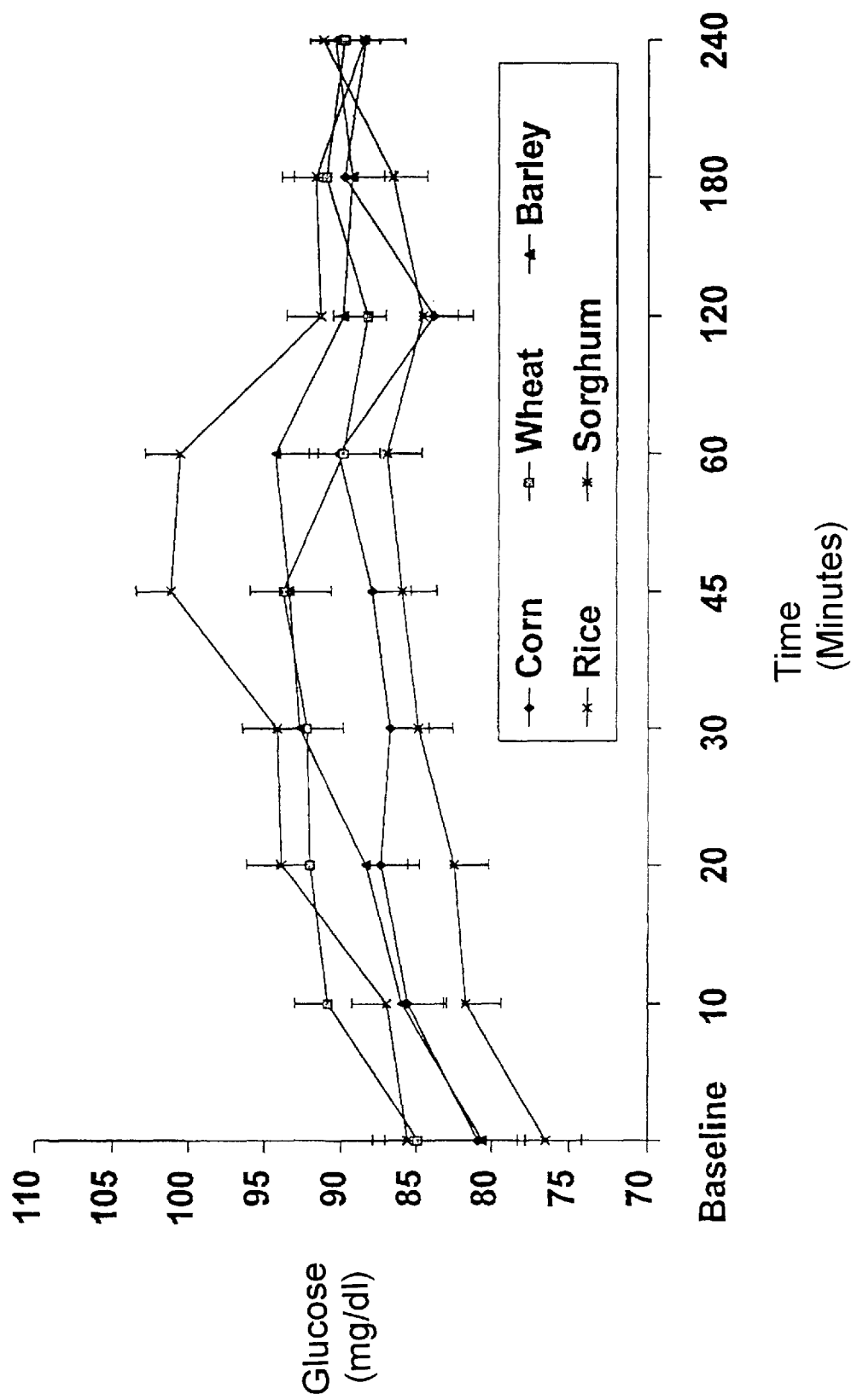
FIG. 1 is a graph illustrating the effect of different sources of starch on glucose levels at selected times after ingestion.

The present invention utilizes a pet food composition which contains a multiple grain source which includes a blend of sorghum and barley as starch sources to control the postprandial rise of both glucose and insulin levels in a companion animal. The use of additional grain sources in the present invention is optional. As used herein, "multiple grain source" means at least two different grains. Through the use of a multiple grain source, the diet of the animal aids in regulating the animal's glucose metabolism in an effective manner. Both healthy animals, as well as animals suffering from diabetes, obesity, geriatric animals, and pregnant animals will benefit from being fed the composition of the present invention.

The composition also optionally contains other compositions which also have the effect of minimizing the postprandial glycemic response in an animal. The composition may include chromium tripicolinate in an amount of from between about 10 to about 250 micrograms of chromium per day. Chromium tripicolinate occurs in brewer's yeast, and the yeast may be added to the pet food composition. Alternatively, the chromium tripicolinate may be added to the composition in a substantially pure form.

The composition may also contain a water soluble cellulose ether such as, for example, carboxymethyl cellulose or hydroxypropylmethyl cellulose ether (HPMC). If carboxymethyl cellulose is used, it is preferably a high viscosity composition in the range of from about 5,000 to about 65,000 cps and is added to the composition in an amount of approximately 1% by weight. If HPMC is utilized, it is preferably also a high viscosity composition in the range of from about 10,000 to about 2,000,000 cps and is added to the composition in an amount of from about 1–2% by weight. A suitable grade of HPMC is available from The Dow Chemical Company under the designation METHOCEL™ K-100M. It has been found that such water soluble cellulose ethers have the effect of delaying the postprandial rise of glucose levels in the animal's blood.

The pet food composition of the present invention may also optionally contain a source of fermentable fibers which display certain organic matter disappearance percentages. The fermentable fibers which may be used have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(OM\ residue-OM\ blank)/OM\ initial]\} \times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al, J. Anim. Sci. 1995, vol. 73:1099–1109.

The pet food composition can be any suitable pet food formula which also provides adequate nutrition for the animal. For example, a typical canine diet for use in the present invention may contain from about 25 to about 35% crude protein, from about 8 to about 12% fat, and from about 5 to about 20% total dietary fiber, along with the source of starch which includes the blend of sorghum and barley. However, no specific ratios or percentages of these nutrients are required.

The fermentable fibers may be any fiber source which intestinal bacteria present in the animal can ferment to produce significant quantities of short-chain fatty acids (SCFAs). "Significant quantities" of SCFAs, for purposes of this invention, are amounts over 0.5 mmol of total SCFAs/gram of substrate in a 24 hour period. Preferred fibers include beet pulp, gum arabic (including gum talha), psyllium, rice bran, carob bean gum, citrus pulp, pectin, fructooligosaccharides and inulsin, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food which is resistant to hydrolysis by animal digestive enzymes. The main components of total dietary fiber are cellulose, hemicellulose, pectin, lignin and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

In order that the invention may be more readily understood, reference is made to the following example which is intended to illustrate the invention, but not limit the scope thereof.

Example 1

Thirty adult ovariohysterectomized female Beagles were used in this experiment. The average body weight of the dogs was 9.62 kg±0.78 (SEM, range: 8.78 to 10.11 kg) at the initiation of the study. Fresh water was provided ad libitum during the entire period of study.

Following a stabilization period which lasted seven weeks, the dogs were randomized into five dietary treatment groups of six dogs each for the first replicate and received one of the five experimental diets. The dogs were re-randomized and assigned to a different experimental diet for the second replicate. Replicates I and II lasted a minimum of two weeks and a glycemic response test was performed at the end of each replicate.

Glycemic response tests were performed at the end of each replicate. The dogs were fasted for 24 hours prior to the initiation of the glycemic test. The catheterization site was shaved, aseptically prepared and the right cephalic vein was catheterized. Blood samples were collected in evacuated tubes containing sodium EDTA Terumo® Venoject tubes, 7.0 ml, Terumo Medical Corp., Elkton, Md.). Two baseline samples were collected approximately five minutes apart. Immediately after the last baseline samples were collected, the dogs were fed 1% of body weight and allowed a maximum of 15 minutes to eat the experimental diets. Dogs not consuming the experimental diet within 15 minutes were excluded from the glycemic test for that day and retested the next day. Additional blood samples were collected at 10, 20, 30, 45, 60, 120, 180, and 240 minutes after the food was consumed. The blood samples were centrifuged at 1300×g for 15 minutes and two aliquots of 1.0 ml of plasma from each time point were frozen within two hours of collection. Plasma glucose concentrations (mg/dl) were determined by hexokinase enzyme method (Cobas Mira, Roche Diagnostic System, Somerville, N.J.) and insulin (IU/ml) was determined by standard radioimmunoassay method using RIA kit (DPC Diagnostic Products Corp., Los Angeles, Calif.).

During the stabilization period, dogs were fed an extruded maintenance diet (Eukanuba Adult Maintenance, The Iams Company, Lewisburg, Ohio) for seven weeks. The ingredient composition of the experimental diets is presented in Table 1, and the chemical composition of the experimental diets is presented in Table 2. The daily feed intake was adjusted for individual dogs during this period until body weights were stable. During the study period, five experimental diets were evaluated. All the diets were formulated to contain equal starch content (approx. 30%) from different cereal sources (corn, wheat, barley, rice, and sorghum). To achieve this, protein levels were allowed to vary considerably and fat levels were allowed to vary slightly. The experimental diets were processed similarly with each starch source consisting of whole grain without the hull. Individual daily feed allowances were based on the stabilization period intake.

TABLE 1

| Ingredient[a] | Corn | Wheat | Barley | Rice | Sorghum |
|---|---|---|---|---|---|
| Starch source[b] | 51.3 | 53.2 | 59.1 | 43.6 | 46.9 |
| Poultry by-product meal | 33.9 | 31.7 | 23.5 | 45.1 | 39.9 |
| Poultry fat | 4.5 | 4.5 | 6.0 | 2.5 | 3.5 |

TABLE 1-continued

| Ingredient[a] | Corn | Wheat | Barley | Rice | Sorghum |
|---|---|---|---|---|---|
| Beet pulp | 4.0 | 4.0 | 4.0 | 4.0 | 4.0 |
| Brewer's yeast | 1.0 | 1.0 | 1.0 | 1.0 | 1.0 |
| Chicken digest | 1.0 | 1.0 | 1.0 | 1.0 | 1.0 |
| Vitamins | 0.4 | 0.4 | 0.4 | 0.4 | 0.4 |
| Choline chloride | 0.3 | 0.3 | 0.3 | 0.3 | 0.3 |
| DL-methionine | 0.2 | 0.2 | 0.3 | 0.1 | 0.2 |
| Minerals | 0.3 | 0.3 | 0.3 | 0.3 | 0.3 |
| Calcium carbonate | 1.3 | 1.4 | 1.9 | 0.7 | 1.0 |
| Monosodium phosphate | 1.2 | 1.4 | 1.6 | 0.4 | 1.0 |
| Potassium chloride | 0.6 | 0.6 | 0.6 | 0.6 | 0.6 |

[a]All reported as percentages by weight
[b]Respective cereal flours for each diet

TABLE 2

| Component (%) | Corn | Wheat | Barley | Rice | Sorghum |
|---|---|---|---|---|---|
| Dry matter | 92.0 | 91.7 | 93.6 | 93.0 | 93.6 |
| Protein | 29.7 | 32.0 | 25.2 | 37.0 | 34.3 |
| Fat | 11.1 | 9.8 | 10.8 | 10.3 | 10.9 |
| Ash | 7.2 | 7.4 | 7.8 | 7.3 | 7.7 |
| $NFE_{CF}$[a] | 41.6 | 40.2 | 46.1 | 36.8 | 38.5 |
| $NFE_{TDF}$[b] | 34.2 | 31.4 | 33.7 | 31.0 | 30.4 |
| Starch | 31.3 | 27.9 | 30.9 | 30.2 | 29.4 |
| Crude fiber | 2.4 | 2.2 | 3.7 | 1.8 | 2.2 |
| Total dietary fiber (TDF) | 9.8 | 11.0 | 16.1 | 7.6 | 10.3 |
| β-glucans (total) | 0.0 | 0.2 | 2.3 | 0.1 | 0.1 |
| Calcium | 1.4 | 1.2 | 1.3 | 1.4 | 1.3 |
| Phosphorous | 1.1 | 1.2 | 1.1 | 1.1 | 1.1 |

[a]NFE = Nitrogen free extract; $NFE_{CF}$ is the difference between 100 and the sum of moisture, protein, fat, crude fiber and ash.
[b]$NFE_{TDF}$ is the difference between 100 and the sum of moisture, protein, fat, total dietary fiber, and ash.

Glucose response: A significant (P<0.01) difference in glucose response for diet, time, and diet and time interaction was detected. FIG. 1 summarizes the postprandial glucose levels at different time points. At baseline, plasma glucose levels were significantly lower (P<0.0001) for sorghum as compared to wheat and rice. No differences (P>0.01) were observed between corn, wheat, barley, and rice at baseline. Dietary regimens did not influence glucose levels at 10, 120, 180, and 240 minutes after feeding, but significant differences were observed at 20, 30, 45, and 60 minutes. Sorghum had consistently lower plasma glucose levels than the other diets between 20 and 60 minutes and gradually elevated for the remainder of the time points. Plasma glucose levels of sorghum were not different (P>0.10) from corn, but were lower than (P<0.05) wheat and rice at 20 minutes, wheat, barley, and rice at 30 and 45 minutes, and rice at 60 minutes after feeding. Rice had higher (P<0.05) plasma glucose levels from 20 to 180 minutes as compared to other diets.

TABLE 3

| Diet | Average Glucose* (mg/dl) | Peak Glucose (Mg/dl) | Time Peak (min) | Area Under Curve (mg[min]/dl) |
|---|---|---|---|---|
| Corn | 86.8 ± 1.88[ab] | 96.2 ± 1.76[a] | 92.1 ± 23.04 | 20915 ± 481.85[a] |
| Wheat | 90.3 ± 1.95[bc] | 98.9 ± 2.42[a] | 75.8 ± 19.93 | 21627.9 ± 425.31[ab] |
| Barley | 89.4 ± 2.07[abc] | 99.4 ± 2.54[a] | 121.3 ± 23.84 | 21728.6 ± 518.8[ab] |
| Rice | 92.7 ± 1.67[c] | 108.7 ± 2.38[b] | 73.8 ± 12.45 | 22336.7 ± 471.4[b] |
| Sorghum | 84.5 ± 2.02[a] | 97.3 ± 2.98[a] | 131.3 ± 28.74 | 20640.4 ± 440.47[a] |

All values are expressed as mean ± SEM, means within columns having different superscripts are significantly different (p < 0.05).
*Average of all time points The average plasma glucose level was lower (P<0.05) for sorghum as compared to wheat and rice (Table 3). Rice resulted in higher (P<0.05) glucose levels than corn and sorghum. No significant differences in average plasma glucose levels existed between wheat, barley, and rice. The plasma glucose peak was significantly higher (P<0.05) for rice as compared to all other diets, however, no significant differences (P>0.10) existed between corn, wheat, barley and sorghum. Dietary starch source failed to influence the time of glucose peak. The area under curve (AUC) was higher (P<0.05) for wheat as compared to corn and sorghum and no differences (P>0.10) were noted between corn, wheat, barley, and sorghum.

Figure 2:
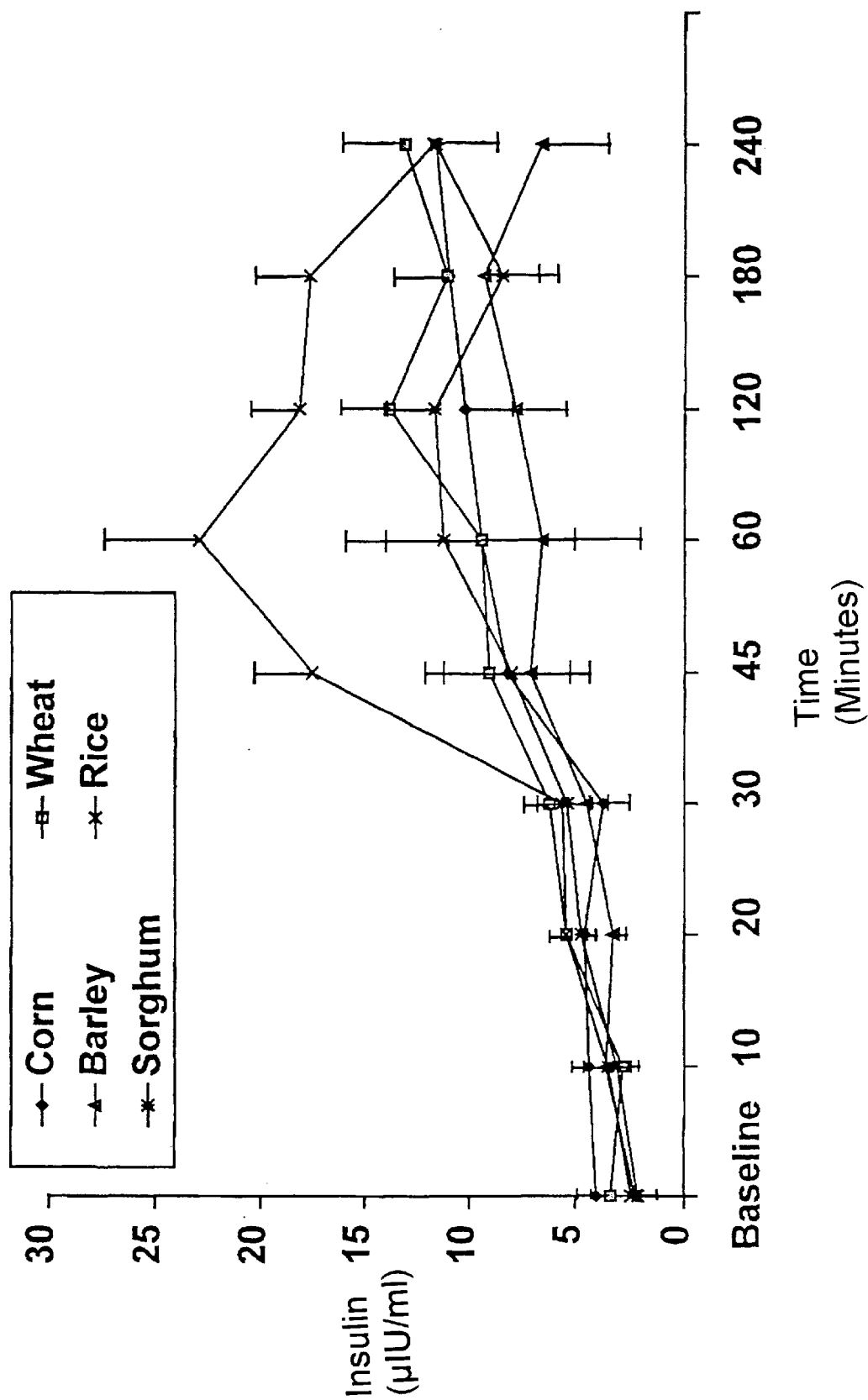
FIG. 2 is a graph illustrating the effect of different sources of starch on insulin levels at selected times after ingestion.

Insulin response: Significant difference (P<0.01) between diets and times was detected (P<0.0001), but the time and diet interaction was not significant (P>0.10) for the postprandial insulin response. FIG. 2 summarizes the insulin levels at different time points. At baseline, the plasma insulin level of corn was higher (P<0.05) than those of barley, rice and sorghum and no significant differences (P<0.10) were noticed between wheat, barley, rice, and sorghum. Dietary regimens did not influence insulin response at 10, 20, 30, 120, 180, and 240 minutes time points, however, rice resulted in higher (P<0.05) insulin at 45, and 60 minutes time points when compared to other diets. Barley had the lowest plasma insulin levels from 20 minutes to 240 minutes, even though the differences were not significant (P>0.10) as compared to the other experimental diets.

TABLE 4

| Diet | Average Insulin* (μIU/ml) | Peak Insulin (μIU/ml) | Time Peak (min) | Area Under Curve (μIU[min]/ml) |
|---|---|---|---|---|
| Corn | 7.41 ± 1.27[a] | 16.6 ± 3.79[a] | 110.0 ± 24.98 | 2343.3 ± 428.54[a] |
| Wheat | 8.26 ± 1.26[ab] | 17.8 ± 3.32[a] | 132.5 ± 20.63 | 2554.9 ± 434.98[ab] |
| Barley | 5.60 ± 0.78[a] | 11.4 ± 1.64[a] | 131.3 ± 19.81 | 1746.4 ± 292.75[a] |
| Rice | 11.67 ± 2.10[b] | 35.92 ± 7.76[b] | 96.3 ± 19.41 | 3794.5 ± 754.66[b] |
| Sorghum | 7.38 ± 1.14[a] | 20.44 ± 4.36[a] | 131.3 ± 23.51 | 2255.6 ± 394.92[a] |

TABLE 4-continued

| Diet | Average Insulin* ($\mu$IU/ml) | Peak Insulin ($\mu$IU/ml) | Time Peak (min) | Area Under Curve ($\mu$IU[min]/ml) |
|---|---|---|---|---|

All values are expressed as mean ± SEM, means within columns having different superscripts are significantly different (p < 0.05).
*Average of all time points The average plasma insulin level was higher (P<0.05) for rice as compared to corn, barley, and sorghum and no differences (P>0.10) were noted between corn, wheat, barley, and sorghum (Table 4). The plasma insulin peak was significantly higher (P<0.05) for rice as compared to all other diets and no differences (P>0.10) existed between corn, wheat, barley, and sorghum. Time of insulin peak was not affected by the dietary regimen. Area under curve was higher (P<0.05) for rice as compared to corn, barley, and sorghum and no differences (P>0.10) were observed between wheat and rice or between corn, wheat, barley, and sorghum. Although not statistically significant, barley consistently resulted in the lowest average insulin, peak insulin, and area under the curve (Table 4).

The resulting low blood glucose response for sorghum and low insulin response for barley to a meal is beneficial for minimizing the glycemic response to a meal by the canine. Additionally, blends of sorghum and barley would give the combined effect of decreasing both postprandial blood glucose and insulin levels after a meal.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A pet food composition for controlling postprandial glycemic response in a companion animal comprising a source of protein, a source of fat, and a source of carbohydrates comprising a blend of sorghum and barley in amounts effective for controlling postprandial glycemic response.

2. A pet food composition as claimed in claim 1 in which the ratio of sorghum to barley is from about 1:3 to about 3:1.

3. A pet food composition as claimed in claim 1 in which the ratio of sorghum to barley is about 1:1.

4. A pet food composition as claimed in claim 1 further including chromium tripicolinate.

5. A pet food composition as claimed in claim 1 further including a water soluble, cellulose ether.

6. A pet food composition as claimed in claim 1 further including from about 1 to about 11 weight percent of supplemental total dietary fiber of fermentable fibers which have an organic matter disappearance of 15 to 60 weight percent when fermented by fecal bacteria for a 24 hour period.

7. A pet food composition for controlling postprandial glycemic response in a companion animal comprising from about 25 to about 35% crude protein, from about 8 to about 12% fat, from about 5 to about 20% total dietary fiber, and a source of starch comprising a blend of sorghum and barley in amounts effective for controlling postprandial glycemic response.

8. A pet food composition as claimed in claim 7 in which the ratio of sorghum to barley is from about 1.3 to about 3:1.

9. A pet food composition as claimed in claim 7 in which the ratio of sorghum to barley is about 1:1.

10. A pet food composition as claimed in claim 7 further including chromium tripicolinate.

11. A pet food composition as claimed in claim 7 further including a water soluble, cellulose ether.

12. A pet food composition as claimed in claim 7 further including from about 1 to about 11 weight percent of supplemental total dietary fiber of fermentable fibers which have an organic matter disappearance of 15 to 60 weight percent when fermented by fecal bacteria for a 24 hour period.

13. A process for controlling postprandial glycemic response in a companion animal comprising the steps of feeding said companion animal a pet food composition consisting essentially of a source of protein, a source of fat, and a source of carbohydrates comprising a blend of sorghum and barley in amounts effective for controlling postprandial glycemic response.

14. A process as claimed in claim 13 in which the ratio of sorghum to barley is from about 1:3 to about 3:1.

15. A process as claimed in claim 13 in which the ratio of sorghum to barley is about 1:1.

16. A process as claimed in claim 13 in which said pet food composition further includes chromium tripicolinate.

17. A process as claimed in claim 13 in which said pet food composition further includes a water soluble, cellulose ether.

18. A process as claimed in claim 13 in which said pet food composition further includes from about 1 to about 11 weight percent of supplemental total dietary fiber of fermentable fibers which have an organic matter disappearance of 15 to 60 weight percent when fermented by fecal bacteria for a 24 hour period.

19. A process for controlling postprandial glycemic response in a companion animal comprising the steps of feeding said companion animal a pet food composition consisting essentially of from about 25 to about 35% crude protein, from about 8 to about 12% fat, from about 5 to about 20% total dietary fiber, and a source of starch comprising a blend of sorghum and barley in amounts effective for controlling postprandial glycemic response.

* * * * *